United States Patent
Kumar

(10) Patent No.: US 10,590,316 B2
(45) Date of Patent: Mar. 17, 2020

(54) CYCLOALIPHATIC-BASED EPOXY ADHESIVE COMPOSITION

(71) Applicant: Illinois Tool Works Inc., Glenview, IL (US)

(72) Inventor: Guruprasad Sudhindra Kumar, Aurora, IL (US)

(73) Assignee: Illinois Tool Works Inc., Glenview, IL (US)

( * ) Notice: Subject to any disclaimer, the term of this patent is extended or adjusted under 35 U.S.C. 154(b) by 192 days.

(21) Appl. No.: 15/652,715

(22) Filed: Jul. 18, 2017

(65) Prior Publication Data

US 2018/0155586 A1    Jun. 7, 2018

Related U.S. Application Data

(60) Provisional application No. 62/430,581, filed on Dec. 6, 2016.

(51) Int. Cl.

| | | |
|---|---|---|
| *C09J 163/00* | (2006.01) | |
| *C09J 163/04* | (2006.01) | |
| *F16B 13/14* | (2006.01) | |
| *C08G 59/32* | (2006.01) | |
| *C08G 59/50* | (2006.01) | |
| *C08K 3/36* | (2006.01) | |
| *C08K 7/14* | (2006.01) | |
| *C08K 7/18* | (2006.01) | |
| *C08K 5/17* | (2006.01) | |
| *C08K 3/22* | (2006.01) | |
| *C08K 3/40* | (2006.01) | |

(52) U.S. Cl.
CPC ............ *C09J 163/00* (2013.01); *C08G 59/32* (2013.01); *C08G 59/50* (2013.01); *C09J 163/04* (2013.01); *F16B 13/142* (2013.01); *C08K 3/36* (2013.01); *C08K 5/17* (2013.01); *C08K 7/14* (2013.01); *C08K 7/18* (2013.01)

(58) Field of Classification Search
CPC ....... C09J 163/00; C09J 163/04; C08G 59/32; C08G 59/50; F16B 13/142; C08K 3/36; C08K 7/14; C08K 7/18; C08K 5/17
USPC .......................................................... 523/400
See application file for complete search history.

(56) References Cited

U.S. PATENT DOCUMENTS

| | | | |
|---|---|---|---|
| 6,291,555 B1 | 9/2001 | Surjan et al. | |
| 6,393,795 B1 | 5/2002 | Irwin et al. | |
| 9,074,114 B2 | 7/2015 | Rourke | |
| 2007/0022709 A1* | 2/2007 | Winterowd | B27M 3/0086 52/741.1 |
| 2007/0105983 A1* | 5/2007 | Kramer | C08G 59/28 523/455 |
| 2008/0027169 A1* | 1/2008 | Ortelt | C08G 59/5026 524/612 |
| 2012/0296038 A1* | 11/2012 | Rourke | C04B 26/16 524/850 |
| 2015/0020965 A1* | 1/2015 | Hibben | C08F 230/08 156/329 |
| 2015/0344615 A1* | 12/2015 | Kasemi | C08G 59/184 528/99 |

OTHER PUBLICATIONS

D.E.R.™ 352 Epoxy Resin, material safety data sheet, The Dow Chemical Company, published Aug. 18, 2011 (8 pages).
D.E.R.™ 352 Liquid Epoxy Resin, product information, The Dow Chemical Company, available prior to Dec. 6, 2016 (3 pages).
EPON 828, material safety data sheet, Polysciences, Inc., Nov. 15, 2013 (3 pages).
Epoxy-Resin-Base Bonding Systems for Concrete, standard specification, ASTM International, published Feb. 2016 (6 pages).
Epoxy Novolac Resin SPI 7431, technical data sheet, Arnette Polymers, LLC, Jan. 2014 (1 page).
Microglass 9132, product specification, Fibertec Inc., available prior to Dec. 6, 2016 (1 page).
Ultraspheres, material safety data sheet, Tolsa USA Inc., Nov. 2011 (6 pages).
Zeeospheres Ceramic Microspheres, safety data sheet, Mar. 25, 2015 (8 pages).

* cited by examiner

*Primary Examiner* — David T Karst
(74) *Attorney, Agent, or Firm* — Neal, Gerber & Eisenberg LLP

(57) ABSTRACT

A new adhesive composition comprising a cycloaliphatic-based epoxy composition, which is particularly suitable for use as a structural adhesive in anchoring applications.

30 Claims, No Drawings

CYCLOALIPHATIC-BASED EPOXY ADHESIVE COMPOSITION

PRIORITY CLAIM

This application claims priority to and the benefit of U.S. Provisional Patent Application No. 62/430,581, filed Dec. 6, 2016, the contents of which are hereby incorporated by reference in its entirety.

FIELD OF THE INVENTION

The present disclosure relates generally to a novel composition comprising cycloaliphatic-based epoxy compounds, which is particularly suitable for use as an aspect of an adhesive composition. The present disclosure further relates to an adhesive composition, which is particularly suitable for use as a structural adhesive in anchoring applications.

BACKGROUND

Adhesives used in anchoring applications have been known to secure anchor pins to boreholes in substrates, including concrete, steel, and wood, among others. Adhesives in anchoring applications should be able to maintain anchor pins orientated at any suitable angle. A typical anchor pin is typically elongated and typically made of steel. The anchor pin may be threaded or non-threaded/reinforcing bar and may have a flat or chiseled end. The anchor pin may be inserted manually or through the use of a driving tool. The driving tool may be a hammer or a power tool, which employs hammering and/or rotational motion.

In a typical application, a borehole is drilled into a substrate member formed of concrete or another material. Then, the interior of the borehole is cleaned to remove dust and dirt particles. The borehole is subsequently filled with a measured amount of an anchoring adhesive. An anchor pin is then driven into the borehole manually or through the use of a driving tool.

The use of adhesives in anchoring applications are useful in industrial or commercial construction, such as construction of bridges, airports/runways, highways, skyscrapers, stadiums, tunnels, and the like.

Due to the heavy duty nature of most anchor pin applications, it is important that the anchoring adhesive maintain a strong adhesive bond between the anchor pin and the borehole under a wide variety of environmental conditions. Properties of anchoring adhesives that are considered important in end-use applications include fast cure time, high compressive strength, high tensile strength, and low shrinkage during curing, etc. There is a need or desire for anchoring adhesives that demonstrate improvements in these and other properties.

SUMMARY

The foregoing and other objectives are achieved in accordance with the teachings and principles of the present disclosure through the provision of a new adhesive composition which comprises a first part comprising a liquid epoxy resin and a second part comprising an Amine. The liquid epoxy resin may comprise a reaction product of epichlorohydrin with bis-phenol A or a reaction product of epichlorohydrin with bis-phenol A and bis-phenol F. The first part may further comprise a high viscosity epoxy Novolac resin and/or one or more thickeners, fillers, additives, or a combination thereof. One suitable filler in the first part is sand, preferably flour grade quartz. One suitable thickener in the first part is fumed silica. Suitable additives for the first part include ceramic microspheres, trimethylolpropane triglycidyl ether, titanium dioxide, or a mixture thereof.

The second part may further comprise one or more thickeners, fillers, additives, or a combination thereof. One suitable filler in the second part is sand, preferable flour grade quartz. One suitable thickener in the second part is fumed silica. Suitable additives in the second part include glass fibers, ceramic microspheres, or a mixture thereof.

The present disclosure further relates to an applicator comprising a volumetric area; a means to expel a mixture or fluid from the volumetric area, and the present adhesive composition. Each part of the present adhesive composition may be separated in the applicator through a barrier. The barrier may be breached through the use of means to expel the present adhesive composition from the applicator.

The present adhesive composition may be used with various methods involving anchoring applications. One exemplary method comprises forming a hole in a substrate; introducing a sufficient amount of the present adhesive composition into the hole; inserting an anchor pin or other steel element into the hole containing the adhesive composition; and allowing the adhesive composition to cure. The substrate may be uncracked or cracked concrete. The hole may be formed by drilling a hole in the substrate. The hole may be prepared through the use of a mechanical means or fluid to remove particulate matter prior to introducing the present adhesive into the hole.

DETAILED DESCRIPTION

Amine Composition

The present disclosure describes a novel composition for use as an aspect of an adhesive composition. The novel composition comprises an Amine. As used herein, an "Amine" refers to the combination of at least three cycloaliphatic amines, an organic acid, and a styrenated phenol.

One skilled in the art would appreciate what compounds are cycloaliphatic amines. In some embodiments, the cycloaliphatic amines are aromatic. In preferred embodiments, the cycloaliphatic amines are non-aromatic. A non-limiting list of cycloaliphatic amines include: isophorondiamine, 5-amino-1,3,3-trimethylcyclohexanemethylamine, diaminocyclohexane, bis(4-aminocyclohexyl)methane, 1,3-bis(aminomethyl)cyclohexane, meta-xylenenediamine and 1-(1-piperazinyl)-2-aminoethane. Particularly suitable cycloaliphatic amines are ones that can crosslink with the other cycloaliphatic amines in the Amine composition and/or act as an accelerator for curing the composition. One skilled in the art could readily identify other cycloalphatic amines for use in the present disclosure.

Similarly, one skilled in the art would readily appreciate what constitutes an organic acid. A non-limiting list include: phosphoric acid, hydroxybenzoic acid, and salicyclic acid. In embodiments, the organic acid is a mild organic acid. In preferred embodiments, the organic acid is salicyclic acid.

In embodiments, each cycloaliphatic amine comprises 6 to 25% of the total weight of the Amine. In other embodiments, one cycloaliphatic amine comprises about 2× the percent weight of each other cycloaliphatic amine. For example, one cycloaliphatic amine may comprise about 20% of the total weight of the Amine whereas each of other two cycloaliphatic amines may comprise about 10% the total weight of the Amine.

In one embodiment, bis(4-aminocyclohexyl)methane comprises about 8 to about 18%; alternatively, 8 to 18%; alternatively, about 8 to about 15%; alternatively, 8 to 15%; alternatively, about 8 to about 12%; alternatively, 8 to 12%; alternatively, about 10% of the total weight of the Amine.

In one embodiment, 1,3-bis(aminomethyl)cyclohexane comprises about 15 to about 25%; alternatively, 15 to 25%; alternatively, about 18 to about 25%; alternatively, 18 to 25%; alternatively, about 20 to about 24%; alternatively, 20 to 24%; alternatively, about 22% of the total weight of the Amine.

In one embodiment, 1-(1-piperazinyl)-2-aminoethane comprises about 6 to about 14%; alternatively, 6 to 14%; alternatively, about 8 to about 14%; alternatively, 8 to 14%; alternatively, about 10 to about 12%; alternatively, 10 to 12%; alternatively, about 11% of the total weight of the Amine.

In one embodiment, the organic acid comprises about 3 to about 9%; alternatively, 3 to 9%; alternatively, about 4 to about 8%; alternatively, 4 to 8%; alternatively, about 6 to about 8%; alternatively, 6 to 8%; alternatively, about 7% of the total weight of the Amine.

In one embodiment, styrenated phenol comprises about 45 to about 65%; alternatively, 45 to 65%; alternatively, about 45 to about 55%; alternatively, 45 to 55%; alternatively, about 47 to about 52%; alternatively, 47 to 52%; or alternatively, about 50% of the total weight of the Amine.

In one embodiment, the Amine can be prepared by dissolving salicylic acid in the cycloaliphatic amines at a temperature from 60 to 70° C. and pressure of 1.0 to 1.5 bar by slowly mixing in the presence of 1,3-bis(aminomethyl)cyclohexane and styrenated phenol. Once dissolved, add 1-(1-piperazinyl)-2-aminoethane and continue mixing with bis(4-aminocyclohexyl)methane. The resultant Amine comprises bis(4-aminocyclohexyl)methane, 1,3-bis(aminomethyl)cyclohexane; salicylic acid; 1-(1-piperazinyl)-2-aminoethane; and styrenated phenol. When prepared accordingly, the components form a matrix. In other embodiments, a similar methodology can be employed where the styrenated phenol and cycloaliphatic amines are added to the organic acid(s) and mixed at an elevated temperature.

In embodiments, the Amine comprises about 40 to about 60%; alternatively, 40 to 60%; alternatively, about 50 to about 60%; alternatively, 50 to 60%; alternatively, about 55 to about 60%; alternatively, 55 to 57%; or alternatively, about 56% (w/w) of the composition.

The composition may further comprise one or more of the thickeners, additives, or fillers, or a combination thereof. For example, the composition may further comprise a ceramic, including ceramic microspheres, which are commercially available from TOLUA USA, Inc. (Suwanee, Ga. 30024) under the trade name ULTRASPHERES or from Zeeospheres Ceramics, LLC (Lockport, La. 70374) under the trade name ZEEOSPHERES CERAMIC MICROSPHERES. As a further example, the composition may further comprise glass fibers. One skilled in the art would appreciate the kind and amount of glass fibers is related to the desired tensile strength of the end product. One suitable glass fiber is commercially available from FIBERTEC (Bridgewater, Mass. 02324) under the trade name MICROGLASS 9132, which has a fiber diameter of 15 microns, a fiber length of 220 microns, and aspect ratio of 14:1, and bulk density of 0.78±0.08 g/cc. As a still further example, the composition may further comprise sand. One skilled in the art can readily appreciate the types of sand suitable for use in the present composition. For example, one suitable sand is SIL-CO-SIL® 63 commercially available from U.S. Silica Company (Frederick, Md. 21701). Particularly suitable sands include sands with elevated surface-area-to-volume ratio relative to common sand. In preferred embodiments, the sand is flour grade quartz.

In embodiments, the thickeners, additives, or fillers comprise about 40 to about 60%; alternatively 40 to 60% (w/w) of the composition. When ceramic microspheres are present in the composition, the ceramic microspheres comprise about 6 to about 25%; alternatively, 6 to 25%; alternatively, about 6 to about 15%; alternatively, 6 to 15%; alternatively, about 6 to about 10%; alternatively, 6 to 10%; or alternatively, 8 to 10% (w/w) of the composition. When glass fibers are present in the composition, the glass fibers comprise about 4 to about 15%; alternatively 4 to 15%; alternatively, about 6 to about 10%; alternatively, 6 to 10%; or alternatively, about 8% (w/w) of the composition. When sand is present in the composition, the sand comprises about 18 to about 30%; alternatively, 18 to 30%; alternatively, about 23 to about 28%; alternatively, 23 to 28%; alternatively, 20 to 25%; alternatively, about 25% (w/w) of the composition. When fumed silica is present in the composition, the fumed silica comprises about 0.5 to about 3%; alternatively, 0.5 to 3%; alternatively, about 1.5 to about 2.5%; alternatively, 1.5 to 2.5%; alternatively, 2 to 2.5% (w/w) of the composition.

An exemplary composition is shown in Table 1:

TABLE 1

| Component | Exemplary Product | Weight Percent |
| --- | --- | --- |
| Amine | | 40-60 |
| Additive | Ceramic Microspheres | 8-25 |
| Additive | Glass Fibers | 4-15 |
| Thickener | Fumed Silica | 0.5-3 |
| Filler | Quartz | 15-40 |

A further exemplary composition is shown in Table 2:

TABLE 2

| Component | Exemplary Product | Weight Percent |
| --- | --- | --- |
| Amine | | 55-57 |
| Additive | Ceramic Microspheres | 8-10 |
| Additive | Glass Fibers | 6-10 |
| Thickener | Fumed Silica | 2.0-2.5 |
| Filler | Quartz | 20-30 |

The composition may be prepared using conventional mixing methods at a temperature of approximately 31° C. One suitable mixing means includes a high shear mixer that is configured to operate while under vacuum. The composition may be prepared by first introducing the Amine into a mixer, then adding the following components, if present, in sequential order: fumed silica, ceramic, glass fiber, and quartz (flour grade). The mixer should operated at sufficient speeds and for a sufficient length of time to achieve a homogeneous or substantially homogeneous mixture whereby the components of the composition are evenly distributed or substantially evenly distributed throughout the mixture.

Composition in Combination to Form Adhesive Composition

The composition described heretofore in the Detailed Description can be used as a part in combination with another part to form with an adhesive composition suitable for use as a structural adhesive in anchoring applications. Such a combination is also referred to as a two-component epoxy-resin bonding system. The composition described heretofore will be referred to hereinafter as "Part A" to further describe the use of the composition in combination.

Part A can be combined with a Part B to form an adhesive composition. In embodiments, the adhesive composition comprises approximately one-third Part A and approximately two-thirds of Part B. The terms "approximately" and "about" are used herein to indicate a ten (10) percent variance (i.e., "approximately one-third"=30-36%). In preferred embodiments, the adhesive composition comprises one-third Part A and two-thirds of Part B.

Part B comprises a liquid epoxy resin. In embodiments, the liquid epoxy resin comprises a reaction product of epichlorohydrin with bis-phenol A. In other embodiments, the liquid epoxy resin comprises the compound of CAS Number 80-05-7. In embodiments, the liquid epoxy resin comprising reaction product of epichlorohydrin with bis-phenol A has an epoxide equivalent weight [EEW] (g/eq) ranging from 400 to 14,000. In other embodiments, the liquid epoxy resin comprises phenolic Novolac resin. In other embodiments, the liquid epoxy resin comprises a mixture of epichlorohydrin with bis-phenol A, phenolic Novolac resin and/or a compound of CAS Number 80-05-7.

One particularly suitable liquid epoxy resin in Part B comprises a reaction product of epichlorohydrin with bis-phenol A and bis-phenol F. It has been observed that liquid epoxy resins containing bis-phenol F have increased shelf-life and reduced risk of crystallization over liquid epoxy resins lacking bis-phenol F.

In preferred embodiments, the liquid epoxy resin comprises poly[(phenyl glycidyl ether)-co-formaldehyde] and oxirane, 2,2'-((1-methylethylidene)bis(4,1-phenyleneoxymethylene))bis-, homopolymer. In these embodiments, it is further preferred that the ratio of poly[(phenyl glycidyl ether)-co-formaldehyde] to oxirane, 2,2'-((1-methylethylidene)bis(4,1-phenyleneoxymethylene))bis-, homopolymer is approximately 1 to 3, alternatively 1 to 3.

In embodiments, the liquid epoxy resin has an epoxide equivalent weight (g/eq) from about 165 to about 190; alternatively, 165 to 190; alternatively, about 170 to about 185; alternatively, 170 to 185; alternatively, about 171 to about 181; or, alternatively, 171 to 181. One suitable liquid epoxy resin for use in the present composition is D.E.R.® 352 available from Dow Chemical Company (Midland, Mich. 48674), which has an epoxide percentage of 23.8 to 25.0%; an epoxide group content of 5520 to 5820 mmol/kg; a viscosity of 5700 to 7700 mPa/second at 25° C.; and a density of 1.17 g/ml at 25° C. Other suitable liquid epoxy resins comprise a mixture of CAS Nos. 25085-99-8 and 28064-14-4, which have the following structures:

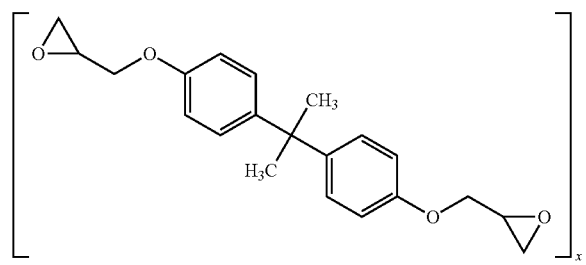

25085-99-8

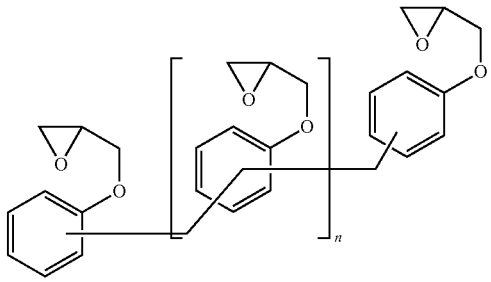

28064-14-4

In some embodiments, the compound of CAS No. 25085-99-8 comprises about 55 to about 95%; alternatively, 55 to 95%; alternatively, about 60 to about 90%; alternatively, 60 to 90%; alternatively, about 65 to about 85%; alternatively, 65 to 85%; alternatively, about 70 to about 80%; alternatively, 70 to 80%; alternatively, about 75%; or alternatively, 75% (w/w) of the liquid epoxy resin.

In some embodiments, the compound of CAS No. 28064-14-4 comprises about 5 to about 45%; alternatively, 5 to 45%; alternatively, about 10 to about 40%; alternatively, 10 to 40%; alternatively, about 15 to about 35%; alternatively, 15 to 35%; alternatively, about 20 to about 30%; alternatively, 20 to 30%; alternatively, about 25%; or alternatively, 25% (w/w) of the liquid epoxy resin.

In embodiments, the liquid epoxy resin comprises about 14 to about 28%; alternatively, 14 to 28%; alternatively, about 20 to about 28%; alternatively, 20 to 28%; alternatively, about 24 to about 28%; alternatively, 24 to 28%; or alternatively, about 26% (w/w) of Part B.

Part B may further comprise a high viscosity epoxy Novolac resin. In embodiments, the high viscosity epoxy Novolac resin has an epoxide equivalent weight (g/eq) from about 150 to about 200; alternatively, about 160 to about 190; alternatively, about 165 to about 185; alternatively, about 170 to about 180; alternatively, 170 to 180; alternatively, about 175; or alternatively, 175. The high viscosity epoxy Novolac resin may have a viscosity at 25° C. greater than 30,000; alternatively, greater than 40,000; alternatively, at least 50,000; alternatively, 30,000 to 70,000; alternatively, 40,000 to 60,000; alternatively, 45,000 to 55,000; alternatively about 50,000; or 50,000 mPa/second. In embodiments, the high viscosity epoxy Novolac resin is phenol-formaldehyde polymer oxiranylmethyl ether. One suitable high viscosity Novolac resin is commercially available from Sigma-Aldrich Co., LLC (St. Louis, Mo. 63103) as Poly[(phenyl glycidyl ether)-co-formaldehyde] (Product Nos. 406775 and 406767). The high viscosity epoxy Novolac resin may comprise the compound of CAS No. 28064-14-4.

In embodiments, the high viscosity epoxy Novolac resin comprises about 4 to about 12%; alternatively, 4 to 12%; alternatively, about 8 to about 12%; alternatively, 8 to about 12%; alternatively, about 10 to about 12%; or alternatively 10 to 12% (w/w) of Part B.

Part B may further comprise one or more thickeners, additives, or fillers, or a combination thereof. For example, Part B may further comprise quartz, which is commercially available from AGSCO Corporation (Wheeling, Ill. 60090). In preferred embodiments, the quartz is flour grade. As another example, Part B may further comprise trimethylolpropane triglycidyl ether, which is commercially available from Sigma-Aldrich Co., LLC (St. Louis, Mo. 63103). As yet another example, Part B may further comprise fumed silica, which is commercially available from Sigma-Aldrich Co., LLC (St. Louis, Mo. 63103). As still another example, Part B may further comprise titanium dioxide, which is commercially available from Sigma-Aldrich Co., LLC (St. Louis, Mo. 63103). As a final example, Part B may further comprise a ceramic, including ceramic microspheres, which are commercially available from TOLUA USA, Inc. (Suwanee, Ga. 30024) under the trade name ULTRASPHERES or from Zeeospheres Ceramics, LLC (Lockport, La. 70374) under the trade name ZEEOSPHERES CERAMIC MICROSPHERES.

In embodiments, the thickeners, additives, or fillers comprise about 34 to about 67%; alternatively 34 to 67% (w/w) of Part B. When quartz is present in Part B, the quartz may comprise about 30 to about 55%; alternatively 30 to 55%; alternatively, about 45 to about 55%; alternatively, 45 to 55%; alternatively, about 50%. (w/w) of Part B. When trimethylolpropane triglycidyl ether is present in Part B, the trimethylolpropane triglycidyl ether may comprise about 2 to about 16%; alternatively, 2 to 16%; alternatively, about 2 to 10%; alternatively, 2 to 10%; alternatively, about 2 to about 5%; alternatively, 2 to 5%; or alternatively about 3% (w/w) of Part B. When fumed silica is present in Part B, the fumed silica comprises about 1 to about 4% (w/w); or alternatively, 1 to 4% (w/w) of Part B. When titanium dioxide is present in Part B, the titanium dioxide comprises about 0.5 to about 2%; or alternatively, 0.5 to 2% (w/w) of Part B. When ceramic microspheres are present in Part B, the ceramic microspheres comprise about 3 to about 8%; alternatively, 3 to 8%; alternatively, about 5 to about 7; alternatively, 5 to 7%; or alternatively, about 6% (w/w) of Part B.

An exemplary composition of Part B is shown in Table 3.

TABLE 3

| Component | Exemplary Product | Weight Percent |
|---|---|---|
| Liquid epoxy resin | POLY[(PHENYL GLYCIDYL ETHER)-CO-FORMALDEHYDE]/Oxirane, 2,2'-((1-methylethylidene)bis (4,1-phenyleneoxymethylene)) bis-, homopolymer | 14-28 |
| High viscosity epoxy Novolac resin | Phenol-formaldehyde polymer oxiranylmethyl ether | 4-12 |
| Filler | Quartz | 30-55 |
| Thickener | Fumed Silica | 1-4 |
| Additive | Ceramic Microspheres | 3-8 |
| Additive | Trimethylolpropane triglycidyl ether | 8-16 |
| Additive | Titanium dioxide | 0.5-2 |

A further exemplary composition of Part B is shown in Table 4.

TABLE 4

| Component | Exemplary Product | Weight Percent |
|---|---|---|
| Liquid epoxy resin | POLY[(PHENYL GLYCIDYL ETHER)-CO-FORMALDEHYDE]/Oxirane, 2,2'-((1-methylethylidene)bis (4,1-phenyleneoxymethylene)) bis-, homopolymer | 24-28 |
| High viscosity epoxy Novolac resin | Phenol-formaldehyde polymer oxiranylmethyl ether | 4-12 |
| Filler | Quartz | 45-55 |
| Thickener | Fumed Silica | 1-2 |

TABLE 4-continued

| Component | Exemplary Product | Weight Percent |
|---|---|---|
| Additive | Ceramic Microspheres | 5-7 |
| Additive | Trimethylolpropane triglycidyl ether | 8-16 |
| Additive | Titanium dioxide | 0.5-2 |

Part B may be prepared using conventional mixing methods at room temperature. One suitable mixing means includes a high shear mixer that may or may not be capable of re-circulating mixed material and/or configured to operate while under vacuum. Part B may be prepared by first separately mixing the trimethylolpropane triglycidyl ether and high viscosity epoxy Novolac resin to achieve a desired viscosity; then introducing the liquid epoxy resin into a mixer and adding the pre-mixed high viscosity epoxy Novolac resin/trimethylolpropane triglycidyl ether. In embodiments, the pre-mix of high viscosity epoxy Novolac resin/trimethylolpropane triglycidyl ether is done where the ratio of high viscosity epoxy Novolac resin/trimethylolpropane triglycidyl ether is about 3:1. Once mixed, the following components are added, if present, in sequential order: fumed silica, titanium dioxide, ceramic microspheres, and quartz (flour grade). The mixer should operated at sufficient speeds and for a sufficient length of time to achieve a homogeneous or substantially homogeneous mixture whereby the components of Part B are evenly distributed or substantially evenly distributed throughout the mixture.

Packaging of Combination

As would be appreciated by those skilled in the art, Part A should be kept apart from Part B until the user is ready to deploy the adhesive composition for its intended use. Mixing the Part A with Part B results in the formation of a irreversible hard solid. Therefore, Part A should not contact Part B during storage and transport.

Part A and Part B can be separated despite being placed in the same applicator. Those skilled in the art can appreciate the proper barriers (e.g., rubber, plastic]) to keep the parts separate while in the same applicator. The barrier should separate the parts until a plunger or other mechanical means breaks the barrier. Each part may exist as a slurry, matrix or suspension of liquid and solid components.

Methods of Using the Present Composition

The present adhesive composition can be used in a number of applications and applied in a number of manners. Some methods of applying adhesive compositions are disclosed in U.S. Pat. No. 5,965,635, issued to Rancich et al.; U.S. Pat. No. 6,228,207, issued to Rancich et al.; U.S. Pat. No. 6,291,555, issued to Surjan et al.; U.S. Pat. No. 6,402,434, issued to Surjan et al.; U.S. Pat. No. 6,403,678, issued to Surjan et al.; U.S. Pat. No. 6,416,256, issued to Surjan et al.; U.S. Pat. No. 6,420,458, issued to Surjan et al.; U.S. Pat. No. 6,822,017, issued to Kish et al.; U.S. Pat. No. 7,163,971, issued to Rancich et al.; U.S. Pat. No. 7,226,650, issued to Liu et al.; and U.S. Pat. No. 7,368,170, issued to Liu et al., U.S. Pat. No. 7,411,010, issued to Kish et al.; all of which are incorporated herein by reference in their entireties.

One exemplary method comprises:
drilling a hole in a substrate;
introducing a sufficient amount of the present adhesive composition (Part A and Part B) into the hole;
inserting an anchoring pin or other steel element into the hole containing the present composition; and
allowing the present adhesive composition to cure.

The method may be performed in humid conditions ranging from 45 to 65% humidity or when the substrate is wet. The method may further comprise preparing the hole in the substrate through the use of a mechanical means (such as a drill or wire brush) or fluid to remove particulate matter. The method may further comprise mixing Part A with a liquid epoxy resin or Part B prior to introducing a sufficient amount into the hole.

In preferred embodiments, the substrate is uncracked or cracked concrete. In other embodiments, a sufficient amount of the present composition or Part A comprises 30 to 70%; alternatively, 40 to 70%; alternatively, 50 to 70%; alternatively, 55 to 65%; alternatively, about 60%; or alternatively 60% of the total volume of the hole. In preferred embodiments, the steel element a threaded rod. In preferred embodiments, the cure time is less than 8 hours; alternatively, less than 7.5 hours; alternatively, less than 7.0 hours; alternatively, about 6.5 hours; or alternatively, 6.5 hours at 70° F.

Properties of the Adhesive Composition

When Part A and Part B are combined, it has been observed that the resultant adhesive composition cures at surprising rate. Indeed, the time to cure the adhesive composition comprising Part A and Part B was measured to be 6.5 hours at 70° F. where the industry standard is 8 to 10 hours. Observed cure times of 2.75 hours and 2.0 hours at temperatures of 90° F. and 110° F., respectively, are also improved over industry standards.

In embodiments, the present adhesive composition has a cure time of less than 8 hours; alternatively, less than 7.5 hours; alternatively, less than 7.0 hours; alternatively, about 6.5 hours; or alternatively, 6.5 hours at 70° F.

In other embodiments, the present adhesive composition has a cure time of less than 4 hours; alternatively, less than 3.5 hours; alternatively, less than 3.0 hours; alternatively, about 2.75 hours; or alternatively, 2.75 hours at 90° F.

In still other embodiments, the present adhesive composition has a cure time of less than 3.5 hours; alternatively, less than 3.0 hours; alternatively, less than 2.5 hours; alternatively, about 2.0 hours; or alternatively, 2.0 hours at 110° F.

In addition to the improvement in cure time, the present adhesive composition demonstrates superior physical properties as shown in the Examples.

Example 1

Strength Testing—Average Pullout.

To determine the strength of the bond between the present adhesive composition, substrate, and an anchor pin, the protocol set forth in ASTM E 488, incorporated by reference herein, was used. An appropriate size hole for the target anchor pin was drilled into concrete. Threaded rods were used as the anchor pin. The diameter of the hole was approximately 1/16" larger than the diameter of the threaded rod. The depth of the hole will vary depending on the performance desired. One skilled in the art would appreciate the hole depth needed to achieve the desired performance metric in light of the present disclosure. Once the hole was drilled, the hole was prepared by using wire brushes and circulating compressed air to remove dirt and particulates. After the drill hole has been prepared, approximately 60% of the total volume of the hole is filled with present adhesive composition comprising Part A of Table 2 and Part B of Table 4. The threaded rod was then inserted into the hole and the adhesive composition was allowed to cure.

To determine the strength of the adhesive, standard pullout equipment (e.g., Toni Technik or Enerpac hydraulic unit) was used. The threaded rod was introduced into the pullout equipment. The equipment then exerted a force to attempt to remove the threaded rod from the cured present adhesive composition disposed within the drilled hole. Tables 4-6 demonstrate the average pullout results of this testing conducted within a temperature range of 66 to 72° F. The numerical results in Tables 4-6 are expressed in pounds (lbs) required to remove the threaded rod from the cured present composition or a cured prior art epoxy composition without cycloaliphatic compounds. The prior art epoxy composition without cycloaliphatic compounds comprised a first part comprising a bisphenol-A type epoxy and talc and a second part comprising 1,3-benzenedimethylamine and sand. In Tables 4-6, a one-half inch steel threaded rod was used in combination with an anchor plate (i.e., confined).

In Table 4, the hole depth was 2.5 inches and a Manual Enerpac unit was used to measure the force required to remove the threaded rod. The compositions were allowed to cure for seven (7) hours before the strength testing was evaluated.

TABLE 4

| Trial | Prior Art Epoxy Composition | Present Adhesive Composition |
| --- | --- | --- |
| 1 | 11,000 | 21,000 |
| 2 | 11,500 | 18,000 |
| 3 | 10,500 | 19,500 |
| 4 | 11,000 | 18,500 |
| 5 | 11,500 | 18,000 |

Table 4 clearly demonstrates the increased bond strength formed between a confined threaded rod and the adjacent concrete using the present adhesive composition when the composition is allowed to cure for 7 hours.

In Table 5, the hole depth was 2.5 inches and a Manual Enerpac unit was used to measure the force required to remove the threaded rod. The compositions were allowed to cure for twenty-four (24) hours before the strength testing was evaluated.

TABLE 5

| Trial | Prior Art Epoxy Composition | Present Adhesive Composition |
| --- | --- | --- |
| 1 | 11,500 | 18,000 |
| 2 | 13,500 | 21,000 |
| 3 | 14,000 | 22,000 |
| 4 | 13,000 | 20,500 |
| 5 | 14,000 | 16,000 |

Table 5 clearly demonstrates the increased bond strength formed between a confined threaded rod and the adjacent concrete using the present adhesive composition when the composition is allowed to cure for 24 hours.

In Table 6, the hole depth was increased to 3.5 inches and a Toni Technic or Semi Automatic Enerpac was used to determine the force required to remove the threaded rod from the compositions. The compositions were allowed to cure for twenty-four (24) hours before evaluation.

TABLE 6

| Trial | Prior Art Epoxy Composition | Present Adhesive Composition |
| --- | --- | --- |
| 1 | 17,279 | 26,041 |
| 2 | 16,757 | 26,917 |
| 3 | 17,732 | 27,819 |

TABLE 6-continued

| Trial | Prior Art Epoxy Composition | Present Adhesive Composition |
|---|---|---|
| 4 | 16,211 | 26,028 |
| 5 | 16,622 | 24,311 |

Table 6 clearly demonstrates the increased bond strength formed between a confined threaded rod and the adjacent concrete using the present adhesive composition across different hole depths when the composition is allowed to cure for 8? hours.

The present disclosure further notes that using the present composition without an anchor plate (i.e., unconfined) manner also shows superiority over existing prior art compositions. Still further, the present disclosure notes that the use of the present composition results in an unexpected high bond strength for reinforcing bars relative to threaded rods as set forth in Tables 7 and 8. The force noted in Tables 7 and 8 was the force required to remove the threaded rod or reinforced bar from the respective cured compositions and is a mean resulting from 5 experiments. Again, the diameter of the hole is approximately 1/16" greater than the rod or bar diameter. For Tables 7 and 8, the present composition was cured for eight (8) hours at 70° C. The prior art epoxy composition was the same as noted for Tables 4-6 and was cured for twenty-four (24) hours at 70° C.

Table 7 shows data for a threaded rod without an anchor plate.

TABLE 7

| | Rod diameter | Hole depth | Force (psi) |
|---|---|---|---|
| Prior Art | 1/2" | 4½ | 1,907 |
| Present Composition | 1/2" | 4⅗ | 2,804 |
| Prior Art | 3/4" | 6¾" | 1,829 |
| Present Composition | 3/4" | 7½" | 2,526 |

Table 7 demonstrates the present adhesive composition exhibits superior bond strength over the prior art epoxy composition for an unconfined threaded rod. Table 8 shows data for a reinforcing bar without an anchor plate.

TABLE 8

| | Bar diameter | Hole depth | Force (psi) |
|---|---|---|---|
| Prior Art | 1/2" | 4½" | 1,699 |
| Present Composition | 1/2" | 5¼" | 2,206 |
| Prior Art | 3/4" | 6¾" | 1,660 |
| Present Composition | 3/4" | 6¾" | 2,770 |

Table 8 demonstrates the present adhesive composition exhibits superior bond strength over the prior art epoxy composition for an unconfined reinforced bar.

Table 7 in combination with Table 8 shows that the prior art epoxy composition has a greater bond strength when a threaded rod is used as the embedment. This is in agreement with typical adhesive compositions where the bond strength for a threaded rod is greater than the bond strength for a non-threaded reinforcing bar. However, the data surprisingly shows that use of the present composition results in a higher bond strength when a reinforcing bar is used in some instances (compare 3/4" bar diameter data).

Example 2

Compression Modulus Testing. To determine the material's ability to support force at different compression levels, the protocol set forth in ASTM D695 was followed. The protocol set forth in ASTM D695 and the references cited therein are hereby incorporated by reference in their entirety. The present adhesive composition or prior art epoxy composition was formed into 1" by 1" by 2" blocks after a seven (7) day cure. The prior art epoxy composition was allowed to cure at 73° F. The present adhesive composition was allowed to cure at 60° F. The prior art epoxy composition and present adhesive composition used in this testing is identical to the compositions used in Example 1. An increasing force was applied to the test samples and the force required to fracture the cured test sample is shown in Table 9.

TABLE 9

| Prior Art Epoxy Composition | Present Adhesive Composition |
|---|---|
| 527,000 psi | 883,920 psi |

Table 9 demonstrates that the force required to fracture the cured present adhesive composition is greater than the force required to fracture the cured prior art epoxy composition. These results are particularly surprising because a positive correlation exists between cure temperature and the compression modulus value. In other words, the present adhesive composition would be expected to have an even higher compression modulus value if cured at 73° F. as the prior art epoxy composition was.

Example 3

Water Absorption.

To determine the amount of water absorbed, the protocol described in ASTM D570, incorporated by reference herein, was used. The results showed that same prior art epoxy composition without cycloaliphatic compounds had a water absorption of 0.54% measured at 24 hours after a 14 day cure at 73° F. compared to the present adhesive composition had a water absorption of 0.05% under the same conditions. As one skilled in the art would appreciate, the presence of water in the composition would lead to unwanted expansion and contraction during temperature modulation.

EMBODIMENTS

The present disclosure notes that various embodiments are disclosed herein, including:

A. An adhesive composition comprising: a first part comprising a liquid epoxy resin and a second part comprising an Amine.

A1. The adhesive composition of A, where the liquid epoxy resin comprises a reaction product of epichlorohydrin with bis-phenol A.

A2. The adhesive composition of A, wherein the liquid epoxy resin comprises a reaction product of epichlorohydrin with bis-phenol A and bis-phenol F.

A2. The adhesive composition of any preceding embodiment, wherein the first part further comprises a high viscosity epoxy Novolac resin.

A3. The adhesive composition of any preceding embodiment, wherein the first part further comprises one or more thickeners, fillers, and/or additives.

A4. The adhesive composition of any preceding embodiment, wherein the second part further comprises one or more thickeners, fillers, and/or additives.

B. An adhesive composition comprising:
a first part comprising a liquid epoxy resin, a high viscosity epoxy Novolac resin, and one or more fillers, thickeners and/or additives; and
a second part comprising an Amine and one or more fillers, thickeners and/or additives.

B1. The adhesive composition of A, where the liquid epoxy resin comprises a reaction product of epichlorohydrin with bis-phenol A.

B2. The adhesive composition of A, wherein the liquid epoxy resin comprises a reaction product of epichlorohydrin with bis-phenol A and bis-phenol F.

B3. The adhesive composition of A, wherein the liquid epoxy resin comprises oxirane, 2,2'-((1-methylethylidene)bis(4,1-phenyleneoxymethylene))bis-, homopolymer.

B4. The adhesive composition of B3, wherein the liquid epoxy resin further comprises poly[(phenyl glycidyl ether)-co-formaldehyde].

B5. The adhesive composition of B4, wherein the ratio of poly[(phenyl glycidyl ether)-co-formaldehyde] to oxirane, 2,2'-((1-methylethylidene)bis(4,1-phenyleneoxymethylene))bis-, homopolymer is approximately 1 to 3, alternatively 1 to 3.

C1. The adhesive composition of A3 to B5, wherein the one or more thickeners, fillers, and/or additives comprises 40 to 60% (w/w) of the second part.

C2. The adhesive composition A3 to C1, wherein the one or more additives comprises ceramic microspheres and/or glass fibers.

C2.A. The adhesive composition of C2, wherein the ceramic microspheres comprise 6 to 25% (w/w) of the second part.

C2.B. The adhesive composition of C2, wherein the ceramic microspheres comprise 6 to 10% (w/w) of the second part.

C2.C. The adhesive composition of C2, wherein the ceramic microspheres comprise 8 to 10% (w/w) of the second part.

C2.D. The adhesive composition of any one embodiment of C2 to C2.C, wherein the glass fibers comprise 4 to 15% (w/w) of the second part.

C2.E. The adhesive composition of any one embodiment of C2 to C2.C, wherein the glass fibers comprise 6 to 10% (w/w) of the second part.

C2.F. The adhesive composition of any one embodiment of C2 to C2.C, wherein the glass fibers comprise 8% (w/w) of the second part.

C3. The adhesive composition of any one embodiment of A3 to C2.F, wherein the one or more fillers comprise sand, preferably sand with a greater surface area than common sand.

C3.A. The adhesive composition of C3, wherein the sand is quartz, preferable flour grade quartz.

C3.A.1. The adhesive composition of C3 or C3.A, wherein the sand or quartz comprises 18 to 30% (w/w) of the second part.

C3.A.2. The adhesive composition of C3 or C3.A, wherein the sand or quartz comprises 23 to 28% (w/w) of the second part.

C3.A.3. The adhesive composition of C3 or C3.A, wherein the sand or quartz comprises 20 to 25% (w/w) of the second part.

C4. The adhesive composition of any one embodiment of A3 to C3.A.2, wherein the one or more thickener comprises fumed silica.

C4.A. The adhesive composition of C4, wherein the fumed silica comprises 0.5 to 3.0% (w/w) of the second part.

C4.B. The adhesive composition of C4, wherein the fumed silica comprises 1.5 to 2.5% (w/w) of the second part.

C5. The adhesive composition of any preceding embodiment, wherein the liquid epoxy resin is 14 to 28% (w/w) of the first part.

C6. The adhesive composition of any one embodiment of A1 to C4.B, wherein the liquid epoxy resin is 20 to 28% (w/w) of the first part.

C7. The adhesive composition of any one embodiment of A1 to C4.B, wherein the liquid epoxy resin is 24 to 28% (w/w) of the first part.

C8. The adhesive composition of any one embodiment of A1 to C4.B, wherein the liquid epoxy resin is 26% (w/w) of the first part C9. The adhesive composition of any preceding embodiment, wherein the liquid epoxy resin has an epoxide equivalent weight from 165 to 195.

C10. The adhesive composition of any one embodiment of A1 to C8, wherein the liquid epoxy resin has an epoxide equivalent weight of 170 to 185.

C11. The adhesive composition of any one embodiment of A1 to C8, wherein the liquid epoxy resin has an epoxide equivalent weight of 171 to 181.

C12. The adhesive composition of any preceding embodiment, wherein the liquid epoxy resin comprises a compound of CAS No. 25085-99-8, a compound of CAS No. 28064-14-4, or a mixture thereof.

C12.A. The adhesive composition of C12, wherein the compound of CAS No. 25085-99-8 comprises 55 to 95% (w/w) of the liquid epoxy resin.

C12.B. The adhesive composition of C12, wherein the compound of CAS No. 25085-99-8 comprises 60 to 90% (w/w) of the liquid epoxy resin.

C12.C. The adhesive composition of C12, wherein the compound of CAS No. 25085-99-8 comprises 60 to 90% (w/w) of the liquid epoxy resin.

C12.D. The adhesive composition of C12, wherein the compound of CAS No. 25085-99-8 comprises 65 to 85% (w/w) of the liquid epoxy resin.

C12.E. The adhesive composition of C12, wherein the compound of CAS No. 25085-99-8 comprises 70 to 80% (w/w) of the liquid epoxy resin.

C12.F. The adhesive composition of C12, wherein the compound of CAS No. 25085-99-8 comprises 75% (w/w) of the liquid epoxy resin.

C12.G. The adhesive composition of any one embodiment of C12 to C12.F, wherein the compound of CAS No. 28064-14-4 comprises 10 to 40% (w/w) of the liquid epoxy resin.

C12.H. The adhesive composition of any one embodiment of C12 to C12.F, wherein the compound of CAS No. 28064-14-4 comprises 15 to 35% (w/w) of the liquid epoxy resin.

C12.I. The adhesive composition of any one embodiment of C12 to C12.F, wherein the compound of CAS No. 28064-14-4 comprises 20 to 30% (w/w) of the liquid epoxy resin.

C12.J. The adhesive composition of any one embodiment of C12 to C12.F, wherein the compound of CAS No. 28064-14-4 comprises 25% (w/w) of the liquid epoxy resin.

C13. The adhesive composition of A2 to C12.J, wherein the high viscosity epoxy Novolac resin has an epoxide equivalent weight of 150 to 200 (e/eq).
- C13.A. The adhesive composition of C13, wherein the high viscosity epoxy Novolac resin has an epoxide equivalent weight of 160 to 190 (e/eq).
- C13.B. The adhesive composition of C13, wherein the high viscosity epoxy Novolac resin has an epoxide equivalent weight of 165 to 185 (e/eq).
- C13.C. The adhesive composition of C13, wherein the high viscosity epoxy Novolac resin has an epoxide equivalent weight of 170 to 180 (e/eq).
- C13.D. The adhesive composition of C13, wherein the high viscosity epoxy Novolac resin has an epoxide equivalent weight of 175 (e/eq).
- C13.E. The adhesive composition of any one embodiment of C13 to C13.D, wherein the high viscosity epoxy Novolac resin has a viscosity at 25° C. of greater than 30,000 mPa/second.
- C13.F. The adhesive composition of any one embodiment of C13 to C13.D, wherein the high viscosity epoxy Novolac resin has a viscosity at 25° C. of greater than 40,000 mPa/second.
- C13.G. The adhesive composition of any one embodiment of C13 to C13.D, wherein the high viscosity epoxy Novolac resin has a viscosity at 25° C. of at least 50,000 mPa/second.
- C13.H. The adhesive composition of any one embodiment of C13 to C13.D, wherein the high viscosity epoxy Novolac resin has a viscosity at 25° C. of 30,000 to 70,000 mPa/second.
- C13.I. The adhesive composition of any one embodiment of A13 to A13.D, wherein the high viscosity epoxy Novolac resin has a viscosity at 25° C. of 40,000 to 60,000 mPa/second.
- C13.J. The adhesive composition of any one embodiment of C13 to C13.D, wherein the high viscosity epoxy Novolac resin has a viscosity at 25° C. of 45,000 to 55,000 mPa/second.
- C13.K. The adhesive composition of any one embodiment of C13 to C13.D, wherein the high viscosity epoxy Novolac resin has a viscosity at 25° C. of 50,000 mPa/second.
- C13.L. The adhesive composition of any one embodiment of C13 to C13.K, wherein the high viscosity epoxy Novolac resin comprises a compound of CAS No. 28064-14-4.
- C13.M. The adhesive composition of any one embodiment of A2 to C13.L, wherein the high viscosity epoxy Novolac resin comprises 4 to 12% (w/w) of the first part.
- C13.N. The adhesive composition of any one embodiment of A2 to C13.L, wherein the high viscosity epoxy Novolac resin comprises 8 to 12% (w/w) of the first part.
- C13.O. The adhesive composition of any one embodiment of A2 to C13.L, wherein the high viscosity epoxy Novolac resin comprises 10 to 12% (w/w) of the first part.

C14. The adhesive composition of any one embodiment of A3 to C13.O, wherein the one or more thickeners, fillers, and/or additives comprises 34 to 67% (w/w) of the first part.

C15. The adhesive composition of any one embodiment of A3 to C14, wherein the one or more fillers comprise sand, preferably sand with a greater surface area than common sand.
- C15.A. The adhesive composition of C15, wherein the sand is quartz, preferably flour grade quartz.
  - C15.A.1. The adhesive composition of C15 or C15.A, wherein the sand or quartz comprises 30 to 55% (w/w) of the first part.
  - C15.A.2. The adhesive composition of C15 or C15.A, wherein the sand or quartz comprises 45 to 55% (w/w) of the first part.

C16. The adhesive composition of any one embodiment of A3 to C15.A.2, wherein the one or more additives comprise ceramic microspheres, trimethylolpropane triglycidyl ether, and/or titanium dioxide.
- C16.A. The adhesive composition of C16, wherein the trimethylolpropane triglycidyl ether comprises 2 to 16% (w/w) of the first part.
- C16.B. The adhesive composition of C16, wherein the trimethylolpropane triglycidyl ether comprises 2 to 10% (w/w) of the first part.
- C16.C. The adhesive composition of C16, wherein the trimethylolpropane triglycidyl ether comprises 2 to 5% (w/w) of the first part.
- C16.D. The adhesive composition of any one embodiment of C16 to C16.C, wherein the ceramic microspheres comprise 3 to 8% (w/w) of the first part.
- C16.E. The adhesive composition of any one embodiment of C16 to C16.C, wherein the ceramic microspheres comprise 5 to 7% (w/w) of the first part.
- C16.F. The adhesive composition of any one embodiment of C16 to C16.E, wherein the titanium dioxide comprises 0.5 to 2% (w/w) of the first part.
- C16.G. The adhesive composition of any one embodiment of C16 to C16.F, wherein the one or more thickeners comprises fumed silica.
  - C16.G.1. The adhesive composition of C16.G, wherein the fumed silica comprises 1 to 4% (w/w) of the first part.

C17. The adhesive composition of any preceding embodiment, wherein the Amine comprises at least three cycloaliphatic amines, wherein the at least three cycloalphiatic amines comprise aromatic cycloaliphatic amines, non-aromatic cycloaliphatic amines, or a mixture of both.
- C17.A. The adhesive composition of embodiment C17, wherein each of the at least three cycloaliphatic amines comprise 6 to 25% of the total weight of the Amine.
- C17.B. The adhesive composition of any one embodiment of C17 to C17.A, wherein one of the at least three cycloaliphatic amines comprise bis(4-aminocyclohexyl)methane.
  - C17.B.1. The adhesive composition of embodiment C17.B, wherein the bis(4-aminocyclohexyl)methane comprises 8 to 18% the total weight of the Amine.
  - C17.B.2. The adhesive composition of embodiment C17.B, wherein the bis(4-aminocyclohexyl)methane comprises 8 to 15% the total weight of the Amine.
  - C17.B.3. The adhesive composition of embodiment C17.B, wherein the bis(4-aminocyclohexyl)methane comprises 8 to 12% the total weight of the Amine.
  - C17.B.4. The adhesive composition of embodiment C17.B, wherein the bis(4-aminocyclohexyl)methane comprises about 10% the total weight of the Amine.

C17.C. The adhesive composition of any one embodiment of C17 to C17.B, wherein one of the at least three cycloaliphatic amines comprise 1,3-bis(aminomethyl)cyclohexane.
  C17.C.1. The adhesive composition of embodiment C17.C, wherein the 1,3-bis(aminomethyl)cyclohexane comprises 15 to 25% the total weight of the Amine.
  C17.C.2. The adhesive composition of embodiment C17.C, wherein the 1,3-bis(aminomethyl)cyclohexane comprises 20 to 24% the total weight of the Amine.
  C17.C.3. The adhesive composition of embodiment C17.C, wherein the 1,3-bis(aminomethyl)cyclohexane comprises about 22% the total weight of the Amine.
C17.D. The adhesive composition of any one embodiment of C17 to C17.C, wherein one of the at least three cycloaliphatic amines comprise 1-(1-piperazinyl)-2-aminoethane.
  C17.D.1. The adhesive composition of embodiment C17.D, wherein the 1-(1-piperazinyl)-2-aminoethane comprises 15 to 25% the total weight of the Amine.
  C17.D.2. The adhesive composition of embodiment C17.D, wherein the 1-(1-piperazinyl)-2-aminoethane comprises 20 to 24% the total weight of the Amine.
  C17.D.3. The adhesive composition of embodiment C17.D, wherein the 1-(1-piperazinyl)-2-aminoethane comprises about 22% the total weight of the Amine.
C17.E. The adhesive composition of any one embodiment C17 to C17.D.3, wherein the Amine further comprises an organic acid.
  C17.E.1. The adhesive composition of C17.E, wherein the organic acid comprises 3 to 9% the total weight of the Amine.
  C17.E.2. The adhesive composition of C17.E, wherein the organic acid comprises 4 to 8% the total weight of the Amine.
  C17.E.3. The adhesive composition of C17.E, wherein the organic acid comprises 6 to 8% the total weight of the Amine.
  C17.E.4. The adhesive composition of C17.E, wherein the organic acid comprises about 7% the total weight of the Amine.
  C17.E.5. The adhesive composition of any one embodiment C17 to C.17.E.4, wherein the organic acid is selected from phosphoric acid, hydroxybenzoic acid, styrenated phenol and salicyclic acid.
  C17.E.6. The adhesive composition of any one embodiment C17 to C.17.E.5, wherein the organic acid is hydroxybenzoic acid.
  C17.E.7. The adhesive composition of any one embodiment C17 to C.17.E.5, wherein the organic acid is salicyclic acid.
C17.F. The adhesive composition of any one embodiment C17 to C17.E, wherein the Amine further comprises styrenated phenol.
  C17.F.1. The adhesive composition of C17.F, wherein the styrenated phenol comprises 45 to 65% the total weight of the Amine.
  C17.F.2. The adhesive composition of C17.F, wherein the styrenated phenol comprises 45 to 55% the total weight of the Amine.
  C17.F.3. The adhesive composition of C17.F, wherein the styrenated phenol comprises 47 to 52% the total weight of the Amine.
  C17.F.4. The adhesive composition of C17.F, wherein the styrenated phenol comprises about 50% the total weight of the Amine.
C17.G. The adhesive composition of embodiment C17, wherein the at least three cycloaliphatic amines are selected from isophorondiamine, 5-amino-1,3,3-trimethylcyclohexanemethylamine, diaminocyclohexane, bis(4-aminocyclohexyl)methane, 1,3-bis(aminomethyl)cyclohexane, meta-xylenenediamine and 1-(1-piperazinyl)-2-aminoethane.
C18. The adhesive composition of any preceding embodiment, wherein the Amine comprises 40 to 60% (w/w) of the second part.
C19. The adhesive composition of any one embodiment of A to C18, wherein the Amine comprises 50 to 60% (w/w) of the second part.
C20. The adhesive composition of any one embodiment of A to C18, wherein the Amine comprises 55 to 60% (w/w) of the second part.
C21. The adhesive composition of any one embodiment of A to C18, wherein the Amine comprises 55 to 57% (w/w) of the second part.
C22. The adhesive composition of any preceding embodiment, wherein the first part comprises 30 to 36% of the total weight of the adhesive composition.
C23. The adhesive composition of any preceding embodiment, wherein the second part comprises 60 to 72% of the total weight of the adhesive composition.
C24. The adhesive composition of any preceding embodiment, wherein the first part comprises 33% of the total weight of the adhesive composition.
C25. The adhesive composition of any preceding embodiment, wherein the second part comprises 67% of the total weight of the adhesive composition.
C26. The adhesive composition of any preceding embodiment, wherein the first part comprises 33% of the total weight of the adhesive composition; and the second part comprises 67% of the total weight of the adhesive composition.
C27. The adhesive composition of any preceding embodiment, wherein the adhesive composition has a cure time of less than 8 hours at 70° F.
C28. The adhesive composition of any one embodiment of A to C26, wherein the adhesive composition has a cure time of less than 7.5 hours at 70° F.
C29. The adhesive composition of any one embodiment of A to C26, wherein the adhesive composition has a cure time of less than 7 hours at 70° F.
C30. The adhesive composition of any one embodiment of A to C26, wherein the adhesive composition has a cure time of 6.5 hours at 70° F.
C31. The adhesive composition of any preceding embodiment, wherein the adhesive composition has a cure time of less than 4 hours at 90° F.
C32. The adhesive composition of any one embodiment of A to C30, wherein the adhesive composition has a cure time of less than 3.5 hours at 90° F.
C33. The adhesive composition of any one embodiment of A to C30, wherein the adhesive composition has a cure time of less than 3 hours at 90° F.
C34. The adhesive composition of any one embodiment of A to C30, wherein the adhesive composition has a cure time of 2.75 hours at 90° F.

C35. The adhesive composition of any preceding embodiment, wherein the adhesive composition has a cure time of less than 3.5 hours at 110° F.

C36. The adhesive composition of any one embodiment of A to C34, wherein the adhesive composition has a cure time of less than 3 hours at 110° F.

C37. The adhesive composition of any one embodiment of A to C34, wherein the adhesive composition has a cure time of less than 2.5 hours at 110° F.

C38. The adhesive composition of any one embodiment of A to C34, wherein the adhesive composition has a cure time of 2 hours at 110° F.

C39. The adhesive composition of any preceding embodiment, wherein the adhesive composition has a water absorption of less than 0.5 as measured by the protocol described in ASTM D570 after a 14 day cure at 73° F.

C40. The adhesive composition of any one embodiment of A to C38, wherein the adhesive composition has a water absorption of less than 0.25 as measured by the protocol described in ASTM D570 after a 14 day cure at 73° F.

C41. The adhesive composition of any one embodiment of A to C38, wherein the adhesive composition has a water absorption of less than 0.10 as measured by the protocol described in ASTM D570 after a 14 day cure at 73° F.

D. A method of embedding an anchor pin comprising:
drilling a hole in a substrate;
introducing a sufficient amount of an adhesive composition of any preceding embodiment into the hole;
inserting an embedment into the hole containing the adhesive composition; and
allowing the adhesive composition to cure.
D1. The method of D, wherein the method is performed in humid conditions.
D2. The method of D or D1, wherein the substrate is wet.
D3. The method of any one embodiment of D to D2, wherein the substrate is uncracked or cracked concrete.
D4. The method of any one embodiment of D to D3, wherein a sufficient amount comprises 30 to 70% of the total volume of the hole.
D5. The method of any one embodiment of D to D3, wherein a sufficient amount comprises 40 to 70% of the total volume of the hole.
D6. The method of any one embodiment of D to D3, wherein a sufficient amount comprises 55 to 65% of the total volume of the hole.
D7. The method of any one embodiment of D to D3, wherein a sufficient amount comprises 60% of the total volume of the hole.
D8. The method of any one embodiment of D to D7, wherein allowing the adhesive composition to cure comprises a cure time of less than 8 hours at 70° F.
D9. The method of any one embodiment of D to D7, wherein allowing the adhesive composition to cure comprises a cure time of less than 7.5 hours at 70° F.
D10. The method of any one embodiment of D to D7, wherein allowing the adhesive composition to cure comprises a cure time of less than 7.0 hours at 70° F.
D11. The method of any one embodiment of D to D7, wherein allowing the adhesive composition to cure comprises a cure time of 6.5 hours at 70° F.
D12. The method of any one embodiment of D to D11, further comprising preparing the hole in the substrate through the use of a mechanical means or fluid to remove particulate matter.
D12.A. The method of D12, wherein the mechanical means is a drill and/or wire brush.

E. An applicator comprising:
a volumetric area;
a means to expel a mixture or fluid from the volumetric area,
an adhesive composition of any preceding embodiment.
E1. The applicator of E, wherein the means to expel a mixture or fluid from the volumetric area comprises a plunger.

Obviously, many variations and modifications of the present invention are possible in light of the above teachings. It is therefore to be understood that within the scope of the appended claims, the present invention may be practiced otherwise than as specifically described herein.

I claim:

1. An adhesive composition comprising:
a first part comprising a liquid epoxy resin and ceramic microspheres, and a second part comprising at least three cycloaliphatic amines, an organic acid and a styrenated phenol.

2. The adhesive composition of claim 1, where the liquid epoxy resin comprises a reaction product of epichlorohydrin with bis-phenol A.

3. The adhesive composition of claim 1, wherein the liquid epoxy resin comprises a reaction product of epichlorohydrin with bis-phenol A and bis-phenol F.

4. The adhesive composition of claim 1, wherein the first part further comprises a high viscosity epoxy Novolac resin.

5. The adhesive composition of claim 1, wherein the first part further comprises one or more thickeners, fillers, additives, or a combination thereof.

6. The adhesive composition of claim 5, wherein the filler in the first part is sand.

7. The adhesive composition of claim 6, wherein the sand in the first part is flour grade quartz.

8. The adhesive composition of claim 5, where the thickener in the first part is fumed silica.

9. The adhesive composition of claim 5, wherein the additive in the first part is trimethylolpropane triglycidyl ether, titanium dioxide, or a mixture thereof.

10. The adhesive composition of claim 1, wherein the second part further comprises one or more thickeners, fillers, additives, or a combination thereof.

11. The adhesive composition of claim 10, wherein the filler in the second part is sand.

12. The adhesive composition of claim 11, wherein the sand in the second part is flour grade quartz.

13. The adhesive composition of claim 10, where the thickener in the second part is fumed silica.

14. The adhesive composition of claim 10, wherein the additive in the second part is glass fibers, ceramic microspheres, or a mixture thereof.

15. A method of embedding an anchor pin comprising:
forming a hole in a substrate;
introducing a sufficient amount of an adhesive composition of claim 1 into the hole;
inserting an anchor pin or other steel element into the hole containing the adhesive composition; and
allowing the adhesive composition to cure.

16. The method of claim 15, wherein the substrate is uncracked or cracked concrete.

17. The method of claim 15, wherein forming a hole in a substrate comprises drilling a hole in the substrate.

18. The method of claim 15, further comprising preparing the hole in the substrate through the use of a mechanical means or fluid to remove particulate matter.

19. An applicator comprising:
a volumetric area;
a means to expel a mixture or fluid from the volumetric area, and
an adhesive composition of claim 1.

20. The applicator of claim 19, wherein the means to expel a mixture or fluid from the volumetric area comprises a plunger.

21. The adhesive composition of claim 1, wherein the at least three aliphatic amines in the first part comprise 1,3-bis(aminomethyl)cyclohexane, 1-(1-piperazinyl)-2-aminoethane and bis(4-aminocyclohexyl)methane.

22. The adhesive composition of claim 21, wherein the first part further comprises titanium dioxide.

23. The adhesive composition of claim 22, wherein the second part further comprises glass fibers.

24. The adhesive composition of claim 23, wherein the organic acid is salicylic acid.

25. The adhesive composition of claim 24, where the first part further comprises flour grade quartz.

26. The adhesive composition of claim 21, wherein the second part further comprises ceramic microspheres.

27. The adhesive composition of claim 26, wherein the second part further comprises titanium dioxide.

28. The adhesive composition of claim 27, wherein the second part further comprises flour grade quartz.

29. The adhesive composition of claim 21, wherein the liquid epoxy resin comprises a reaction product of epichlorohydrin with bis-phenol A and bis-phenol F.

30. The adhesive composition of claim 21, wherein the second part further comprises a high viscosity epoxy Novolac resin.

\* \* \* \* \*